United States Patent [19]

James

[11] 4,175,933
[45] Nov. 27, 1979

[54] DUST FILTER APPARATUS

[75] Inventor: Granville C. James, Ashby-de-la-Zouch, England

[73] Assignee: Coal Industry (Patents) Limited, London, England

[21] Appl. No.: 944,101

[22] Filed: Sep. 20, 1978

Related U.S. Application Data

[63] Continuation of Ser. No. 836,828, Sep. 26, 1977, abandoned.

[30] Foreign Application Priority Data

Oct. 22, 1976 [GB] United Kingdom ............... 43927/76

[51] Int. Cl.² ............................................. B01D 47/00
[52] U.S. Cl. ........................................ 55/259; 55/233; 55/240; 55/525; 261/105; 261/106; 261/112; 261/118
[58] Field of Search ............... 55/240, 241, 525, 527, 55/260, 259, 257 R, 233; 261/101–107, 112, 118

[56] References Cited

U.S. PATENT DOCUMENTS

| 2,327,184 | 8/1943 | Goodloe | 55/525 X |
| 3,280,542 | 10/1966 | Heijnis | 55/525 X |
| 3,628,311 | 12/1971 | Costarella et al. | 55/240 X |
| 3,648,440 | 3/1972 | Egan | 55/240 X |
| 3,659,402 | 5/1972 | Alliger | 55/525 X |
| 3,870,082 | 3/1975 | Holl | 55/240 X |
| 3,880,626 | 4/1975 | Griwatz et al. | 55/525 X |

FOREIGN PATENT DOCUMENTS

| 695445 | 12/1930 | France | 55/240 |
| 1412299 | 11/1975 | United Kingdom | 55/240 |

Primary Examiner—Richard L. Chiesa
Attorney, Agent, or Firm—James C. Wray

[57] ABSTRACT

Dust filter apparatus includes a filter panel and a nozzle spraying liquid into the gaseous flow upstream of the filter panel which comprises a plurality of layers each extending across the gaseous flow duct and at least alternate layers defining at least portions of passageways for liquid flowing down the filter panel, flow of liquid in the panel tending to be restrained by the filter layers such that in use a liquid curtain is formed across the duct.

13 Claims, 4 Drawing Figures

DUST FILTER APPARATUS

This is a continuation of application Ser. No. 836,828, filed Sept. 26, 1977, and now abandoned.

This invention relates to dust filter apparatus.

In particular, this invention is an improvement in or a modification of the dust filter apparatus as described and claimed in our prior British patent specification No. 1,412,299 which comprises a chamber providing a gaseous flow duct, a filter unit including a fibrous mat filter arranged across the duct, and nozzle means for spraying liquid into the gaseous flow duct upstream of the mat filter, the mat filter having a fibre density such that the mat filter retains substantially no liquid by capillary action and permits flow of liquid throughout the thickness of the filter in the directions parallel to, and transverse to, the direction of gaseous flow and having a loft or thickness such that in use the liquid from the nozzle means for spraying liquid saturates the whole of the mat filter, the arrangement being such that, in use, a continuous body of flowing liquid is formed coincident with the mat filter across the gaseous flow duct and having a thickness substantially equal to the thickness of the mat filter.

Unfortunately such a prior known filter mat filter suffers from the disadvantage that it has a relatively short operational life.

One object of the present invention is to provide dust filter apparatus which tends to reduce the above mentioned disadvantage.

According to the present invention dust filter apparatus comprises a chamber providing a gaseous flow duct, a filter unit including a filter panel arranged across the duct, and nozzle means for spraying liquid into the gaseous flow duct upstream of the filter panel, the filter panel comprising a plurality of filter layers arranged side by side, each filter layer extending across the duct and at least alternate filter layers defining at least portions of passageways for liquid flowing down the filter panel between two adjacent filter layers, flow of liquid in the panel tending to be restrained by the filter layers such that in use a liquid curtain is formed across the duct.

Preferably, each filter layer comprises material which is crimped to define the portions of the passageways.

Advantageously, the material is knitted wire.

Preferably, the wire is stainless steel.

Preferably, the filter panel comprises filter layers of fine and coarse knitted wire.

By way of example only, one embodiment of the present invention will be described with reference to the accompanying drawings, in which.

Figure 1:
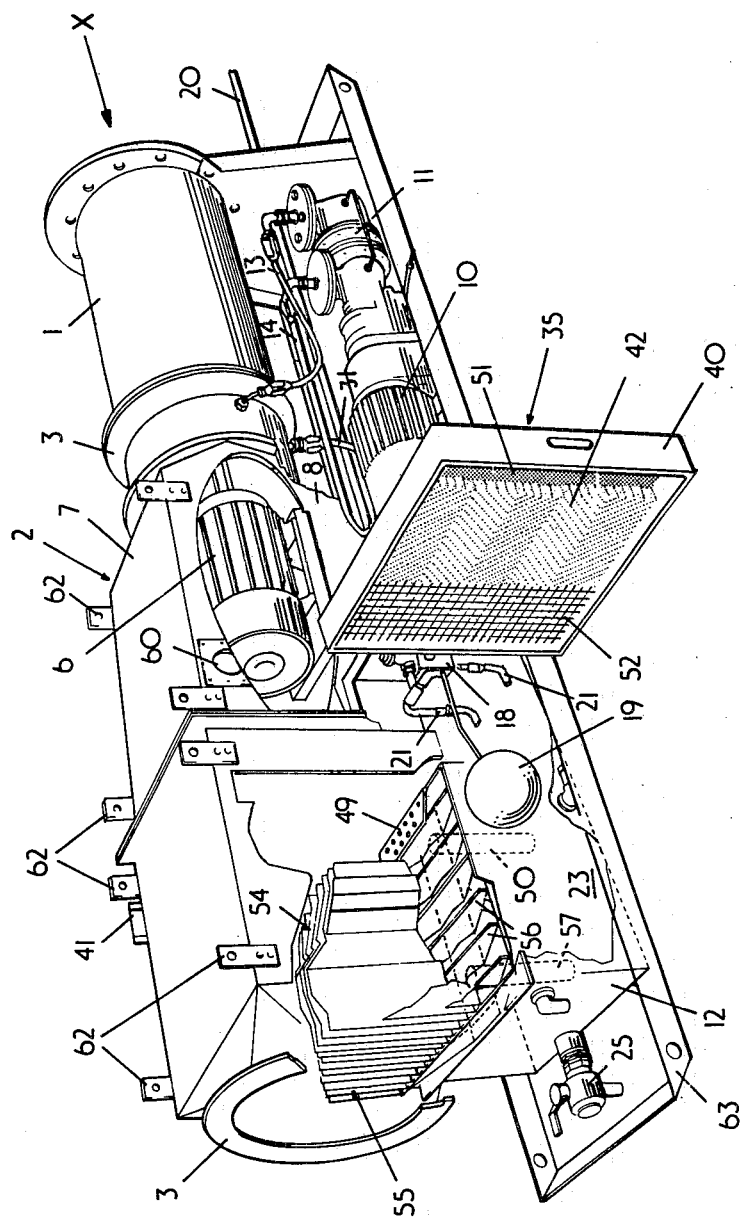
FIG. 1 is a perspective partly cut away view of dust filter apparatus constructed in accordance with the present invention.
Figure 2:
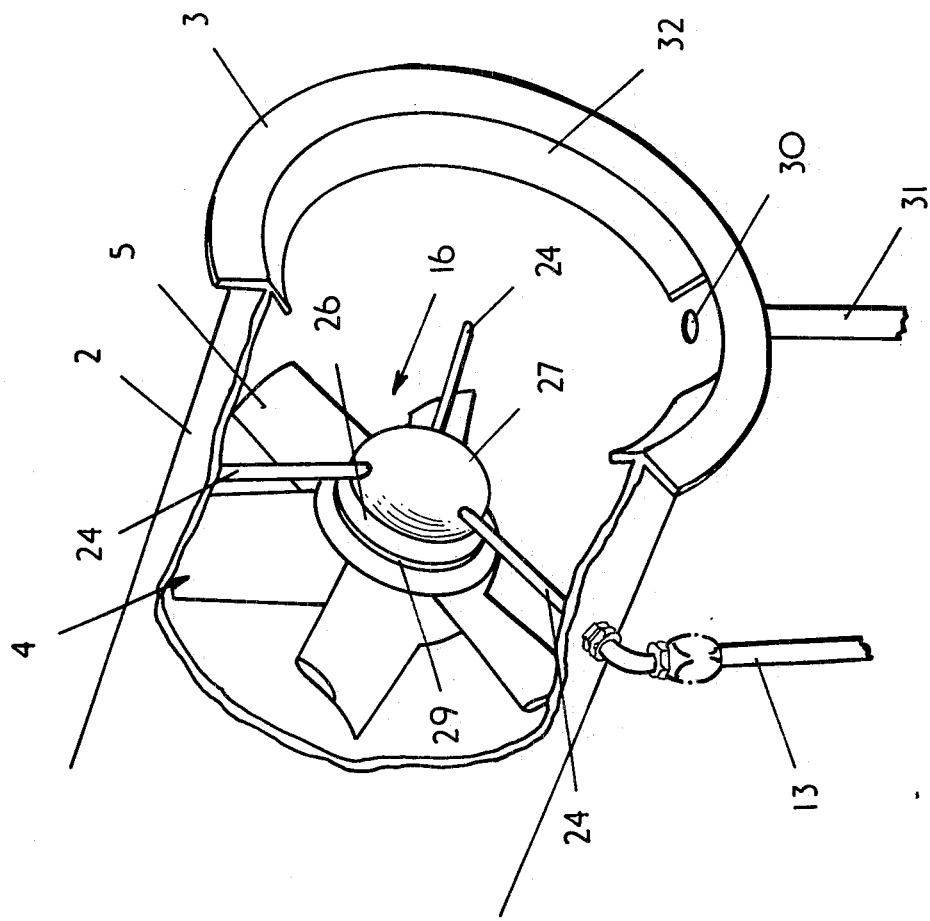
FIG. 2 is an enlarged view of a part of a detail of FIG. 1, the part being seen from a different angle to FIG. 1.

The dust filter apparatus shown in FIG. 1 comprises an assembled chamber 2 which provides an air flow duct extending the length of the dust filter apparatus. The ends of the chamber 2 have flanges 3 for the attachment of extension ducting 1 (only the length of which is shown). Air is induced to flow through the apparatus in a direction indicated by arrow x by a fan 4 (see particularly FIG. 2) having a drive shaft drivably supporting an impeller 5 located within the portion of the air flow duct adjacent to the inlet of the chamber 2. The duct inlet and outlet are provided with guard screens (not shown). The fan is driven by an electric motor 6 which is housed between the upper and lower branches 7 and 8 of the air flow duct.

The apparatus also comprises a pump 11 driven by an electric motor 10 and located in a protected zone beneath the chamber 2. The pump 11 recirculates water from a sealed collection or settling tank 12 through pipes 13 and 14 to nozzle means 16, located upstream of the fan adjacent to the duct inlet. The inlet section of the suction pipe 14 is located within the settling tank 12. The flow of water towards the pipe 14 is insufficient for collected coarse dust particles in the tank to be carried by the water flow and thereby block the nozzle means 16.

The water level in the settling tank 12 is kept substantially at a preselected level by a control valve 18 (only a portion of which is shown in FIG. 1) which is actuated by a floating ball 19 and which feeds water from the mains via branch pipe 20 into a pair of discharge pipes 21. The discharge portion of each of the pipes 21 extends along the inclined tank floor 23 so that water discharging from pipes 21 tends to scour the floor of the tank to urge settled dust particles towards a discharge valve 25.

The settling tank 12 is sealed from the atmosphere to ensure air is not discharged or exhausted from the air flow duct through the tank. By adopting a sealed settling tank it is possible to mount the tank immediately below the air flow ducting.

Water is supplied from the pipe 14 to the nozzle means 16 via one of three support arms 24 radiating from a hub 26 which together with a cap 27 provided adjacent the end of the fan drive shaft 9 define an annular outlet 29 for the nozzle means 16. In use, water is discharged from the annular outlet 29 into the air flow induced along the chamber 2 by the fan 4, the water being introduced into the air flow upstream of the fan so that the action of the fan's impeller as it induces the airflow is to thoroughly mix the water uniformly with the air flow.

In an alternative construction the water is supplied via a nozzle or nozzles positioned upstream of the fan.

In order to ensure that sufficient water is mixed with the air flow it may be necessary to feed excess water through the nozzle means 16. This excess water is thrown by the action of the impeller onto the chamber wall where it is allowed to run down towards a drain hole 30 provided with a drain pipe 31. An inclined plate 32 is provided around the wall of the chamber 2 just upstream of the drain hole 30 to prevent excess water flowing along the duct 1.

Figure 3:
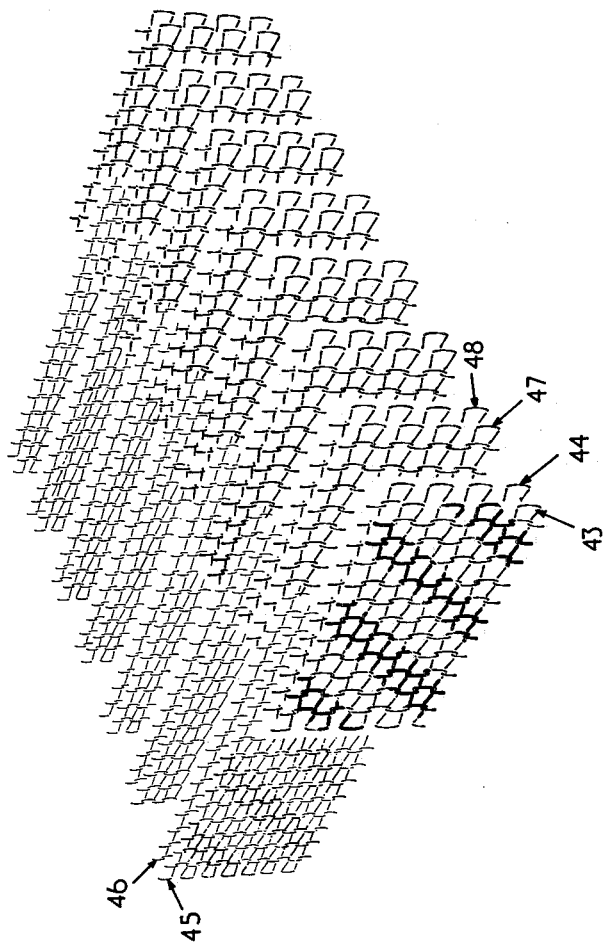
FIG. 3 is an enlarged view of a part of another detail of FIG. 1.
Figure 4:
FIG. 4 is an end view of a part of the detail of FIG. 3.

A filter panel 35 (see FIGS. 1, 3 and 4) is provided across the air flow duct on the downstream side of the fan 4. In FIG. 1, the filter panel 35 is shown withdrawn from its normal operating position across the air flow duct over the settling tank 12. The filter panel comprises an open box frame 40 which can be slid into its normal operating position across the duct via one of two doors 41 (only one of which is shown in FIG. 1) provided on opposed sides of the chamber 2. A plurality of layers of knitted stainless steel wire sheets are arranged side by side within the frame 40. Each sheet extends across the duct and is crimped so as to define passageways 42 for water flowing down the filter panel between two adjacent sheets. The sheets are arranged such that the first two sheets 43, 44 (see FIG. 3) encountered by the air flow along the duct are of relatively coarse wire. These two sheets are followed by two sheets 45, 46 of relatively fine wire which in turn are followed by two further sheets 47, 48 of relatively coarse wire and so on. In FIG. 3 the portions of the sheets illustrated have been displaced for the sake of clarity. In total, the filter panel consists of sixteen layers (i.e. eight pairs) of relatively coarse wire and fourteen layers (i.e. seven pairs) of relatively fine wire sandwiched between adjacent pairs of layers of relatively coarse wire. Typically, the relatively coarse knitted wire has a diameter of two hundred and fifty-four micrometers and is made up to contain approximately two stitches per linear centimeter. Also typically, the relatively fine wire has a diameter of one hundred and fifty-two micrometers and is made up to contain approximately three stitches per linear centimeter. Each layer is crimped (see particularly FIGS. 1, 3 and 4) approximately every one and a quarter centimeters to a depth of approximately half a centimeter. The layers have an effective spacing of approximately half a centimeter.

As indicated in FIGS. 1 and 3 the material is crimped to define vertically inclined passageways for water to flow down between two adjacent layers. In use, when the passageways are filled with restrained water a liquid curtain extending fully across the air flow duct is formed. The relatively coarse wire layers present a relatively low resistance to downward water flow and thereby enable the filter panel to cope with the relatively large volume of water required to suppress high dust concentrations and to clear such dust without causing blockage. The relatively fine wire layers tend to provide more resistance to downward flow of water and thereby tend to retain a relatively slow moving water flow which tends to increase the efficiency of dust particle arrest. Thus, the relatively coarse wire layers enable the filter panel to drain away the necessarily relatively large volume of water without flooding and the relatively fine wire layers enable the filter panel to achieve the necessarily high dust suppression efficiency.

Water flowing down the filter panel is discharged into the settling tank 12 via a drain tray 49 and a drain pipe 50 adjacent to the base of the air duct chamber 2.

The filter panel 35 also is provided with a rigid pre-filter screen 51 which removes relatively large particles from the air flow before it reaches the wire layers thereby protecting the wire layers. In addition, the screen 51 together with a mesh 52 located on the downstream side of the wire layer retain the wire layers in an upright compact position.

A catchment plate assembly is provided on the downstream side of the filter panel 35 to remove excess moisture from the air flow before it is discharged from the filter apparatus. The catchment plate assembly comprises a series of plate sections 54 inclined to the direction of air flow and final guide plate sections 55 arranged in line with the direction of air flow. Each of the inclined plate sections is provided with a water trap (not shown). In use, the moist air flow leaving the filter panel has to travel along the tortuous paths formed by the catchment plate assembly. Upon the direction of air flow being changed due to the inclined plate sections, the water droplets which are denser than air are more likely to keep in a straight path and therefore tend to be trapped. The procedure is repeated by each inclined plate section until by the time the air flow reaches the in-line plate sections 55 it is substantially free from water droplets. The in-line plate sections tend to direct the air flow axially on leaving the apparatus.

Baffle plates 56 are provided immediately beneath the catchment plate assembly to ensure the air flow does not re-entrain water already captured. A drain pipe 57 is provided in the bottom of the chamber beneath the catchment plate assembly to feed water towards the floor of the settling tank.

Two inspection windows 60 (only one of which can be seen in FIG. 1) are provided for checking the water flow condition in the chamber 2. The windows are located directly opposite each other so that a lamp held to one window gives adequate light within the chamber for inspection of the water flow to be carried out.

Suspension brackets 62 are provided on the chamber for enabling the filter apparatus to be suspended from overhead supports as for example mine roof supports in an underground mine roadway. In addition, a skid base 63 is provided allowing the apparatus to be floor mounted. Alternatively the filter apparatus may be mounted on a wheeled base and in which case it may engage a track constituted by a conveyor framework. In the latter case, the tank may be mounted along side the conveyor rather than directly beneath the filter apparatus invention to reduce the overall height of the apparatus when mounted on the conveyor.

In operation, the dust filter apparatus is installed for example, in an underground mine working and extension ducting from the apparatus towards a working face or conveyor transfer station. The filter unit is assembled on its slideway and slid across the air flow duct. The doors are closed to seal the side walls of the chamber and the drive motors 6 and 10 are switched on simultaneously to drive the fan and the pump to induce an air flow along the duct and to spray water into the air flowing through the fan. The water tends to pass through the pre-filter screen and collects on the knitted stainless steel layers. As explained previously water tends to be retained by the relatively fine layers to provide a curtain of water across the duct so that dust particles entrained in the induced air flow are suppressed by becoming wetted. The wetted dust particles are then removed from the filter unit by water flow tending to move down the passageways 42 defined between adjacent layers, particularly passageways associated at least in part with relatively coarse layers. A portion of water is carried by the air flow from the filter panel towards the catchment plate assembly where it is caught in the water traps as previously outlined. Any wetted dust particles carried by the air flow towards the catchment plate assembly are discharged with the water into the settling tank.

The water is collected in the settling tank 12 and recirculated through the nozzle means 16 via the pump 11.

The air flow induced along the ducting will extract dust particles from the dust source and carry them to the filter unit. The pre-filter screen will collect any relatively large dust particles which thereby fall into the settling tank via the drain tray and drain pipe 50. The remainder of the dust particles are carried to the knitted layers of stainless steel wire where they are wetted by contact with the relatively thick, effectively continuous curtain of water as previously explained. Since the water flows rapidly down the passageways defined at least in part by the relatively coarse layers the collected wetted dust particles tend to be continuously washed out of the filter panel into the settling tank 12 via the drain tray and drain pipe.

As the dust particles are continuously and efficiently washed out of the filter panel it is not necessary for the filter to be changed frequently. In addition, the stainless steel sheets have a long operational life. The only servicing which has to be carried out is the infrequent cleaning of the settling tank 12. This is simply and quickly achieved by stopping the drive motor 10 and opening the discharge valve 25 to allow dirty water to drain from the settling tank. As soon as the water level falls below a preselected level the control valve 18 is actuated by the ball 19 to feed mains water into the tank through the discharge pipes 21. The ends of the discharge pipes 21 are adapted to provide fan shaped sprays which scour the floor of the tank to urge the settled dust towards the discharge valve 25. Thus, the settling tank is quickly and easily cleaned and the dust filter apparatus is again ready for operation.

In a modification of the invention the fan may be located downstream of the filter unit so as to draw air through the filter.

In a still further modification the filter panel may be inclined across the air flow.

From the above description it will be seen that the present invention provides dust filter apparatus which is efficient, robust and which has a long operational life.

I claim:

1. Dust filter apparatus comprising a chamber providing a gaseous flow duct, a filter unit including a filter panel arranged across the duct, and nozzle means for spraying liquid into the gaseous flow duct upstream of the filter panel, an impeller positioned in the duct between the nozzle means and the filter panel, an inclined plate provided around a wall of the duct, and a drain in the duct near the inclined plate for draining excess water thrown from the impeller, the filter panel comprising a plurality of filter layers arranged side by side, each filter layer extending across the duct and the filter layers comprising alternating pairs of fine filter layers and pairs of coarse filter layers defining at least portions of passageways for liquid flowing down the filter panel between two adjacent filter layers, flow of liquid in the panel tending to be restrained by the filter layers such that in use a liquid curtain is formed across the duct, the pairs of relatively coarse filter layers presenting a lower resistance to downward flow of water than that presented by the pairs of relatively fine filter layers.

2. Dust filter apparatus as claimed in claim 1, in which each filter layer comprises material which is crimped to define the portions of the passageways.

3. Dust filter apparatus as claimed in claim 2, in which the material is knitted wire.

4. Dust filter apparatus as claimed in claim 3, in which the wire is stainless steel.

5. Dust filter apparatus as claimed in claim 1, in which the filter panel comprises filter layers of fine and coarse knitted wire.

6. The dust filter apparatus of claim 1 wherein the nozzle means comprises a hub held centered in the duct by plural support arms and an annular outlet on the hub for discharging water into the duct.

7. The dust filter apparatus of claim 1 wherein one of the support arms is a tubular connection to a water supply pipe.

8. The dust filter apparatus of claim 1 wherein the impeller includes a drive shaft centered in the duct and having a cap on an end of the drive shaft wherein the cap and the hub are spaced to form the annular outlet.

9. Dust filter apparatus comprising a chamber providing a gaseous flow duct, the duct having an open first end for receiving gas laden with dust particles, and having an open second end for discharging gas free of the dust particles, a filter unit including a filter panel arranged across the duct, and nozzle means for spraying liquid into gas and dust particles in the gaseous flow duct upstream of the filter panel, an impeller positioned in the duct between the nozzle means and the filter panel, an inclined plate provided around a wall of the duct, and a drain in the duct near the inclined plate for draining excess water thrown from the impeller, the filter panel layer extending across the duct and at least alternate filter layers defining at least portions of passageways for liquid and dust particles flowing down the filter panel between two adjacent filter layers, repetitive alternate filter layers comprising alternate pairs of fine filter sheets and pairs of coarse filter sheets, the flow of liquid in the panel tending to be restrained by the filter layers comprising the fine sheets such that in use a flowing liquid curtain is formed across the duct whereby dust particles are continuously removed from the gas flowing through the duct.

10. Dust filter apparatus as claimed in claim 9, in which each filter layer comprises material which is crimped to define the portions of the passageways.

11. Dust filter apparatus as claimed in claim 10, in which the material is knitted wire.

12. Dust filter apparatus as claimed in claim 11, in which the wire is stainless steel.

13. Dust filter apparatus as claimed in claim 9, in which the filter panel comprises filter layers of fine and coarse knitted wire.

* * * * *